Jan. 26, 1965 L. R. MURPHY 3,167,141
TRANSPORTABLE SCALE WITH EXTENDIBLE WIDTH
Filed July 23, 1963 3 Sheets-Sheet 1
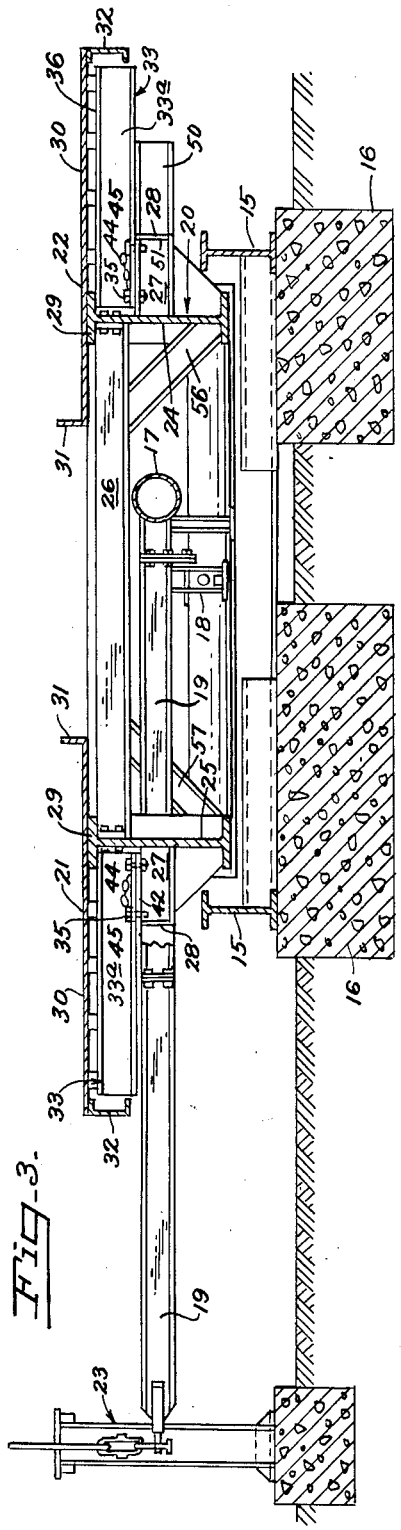
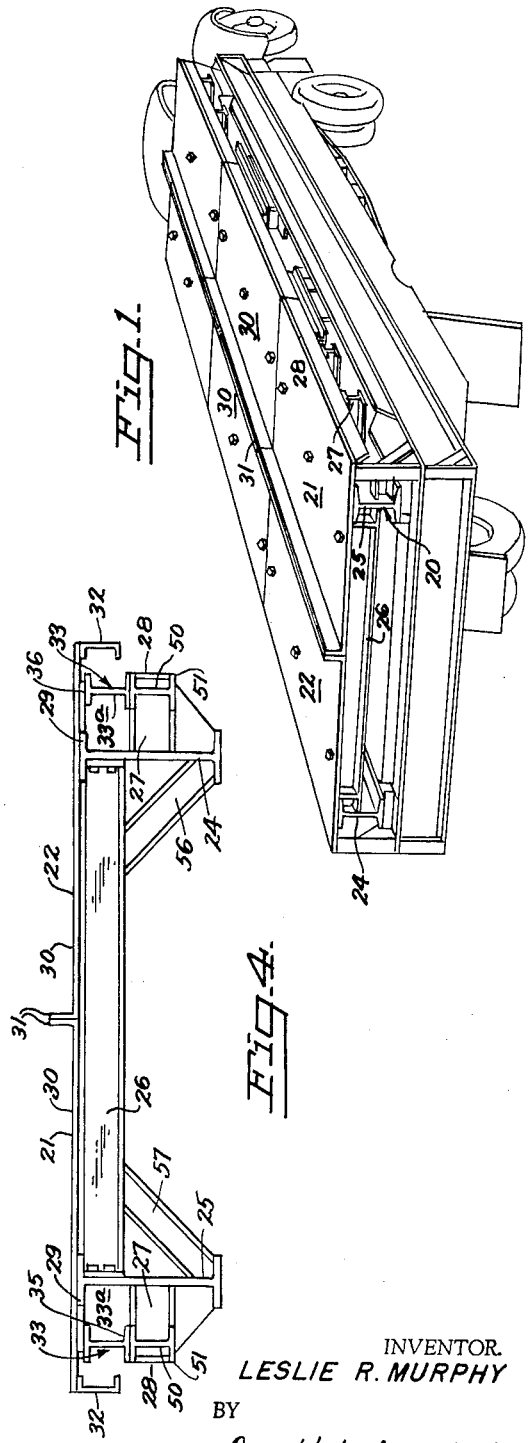
INVENTOR.
LESLIE R. MURPHY
BY
Owen, Wickersham & Erickson
ATTORNEYS

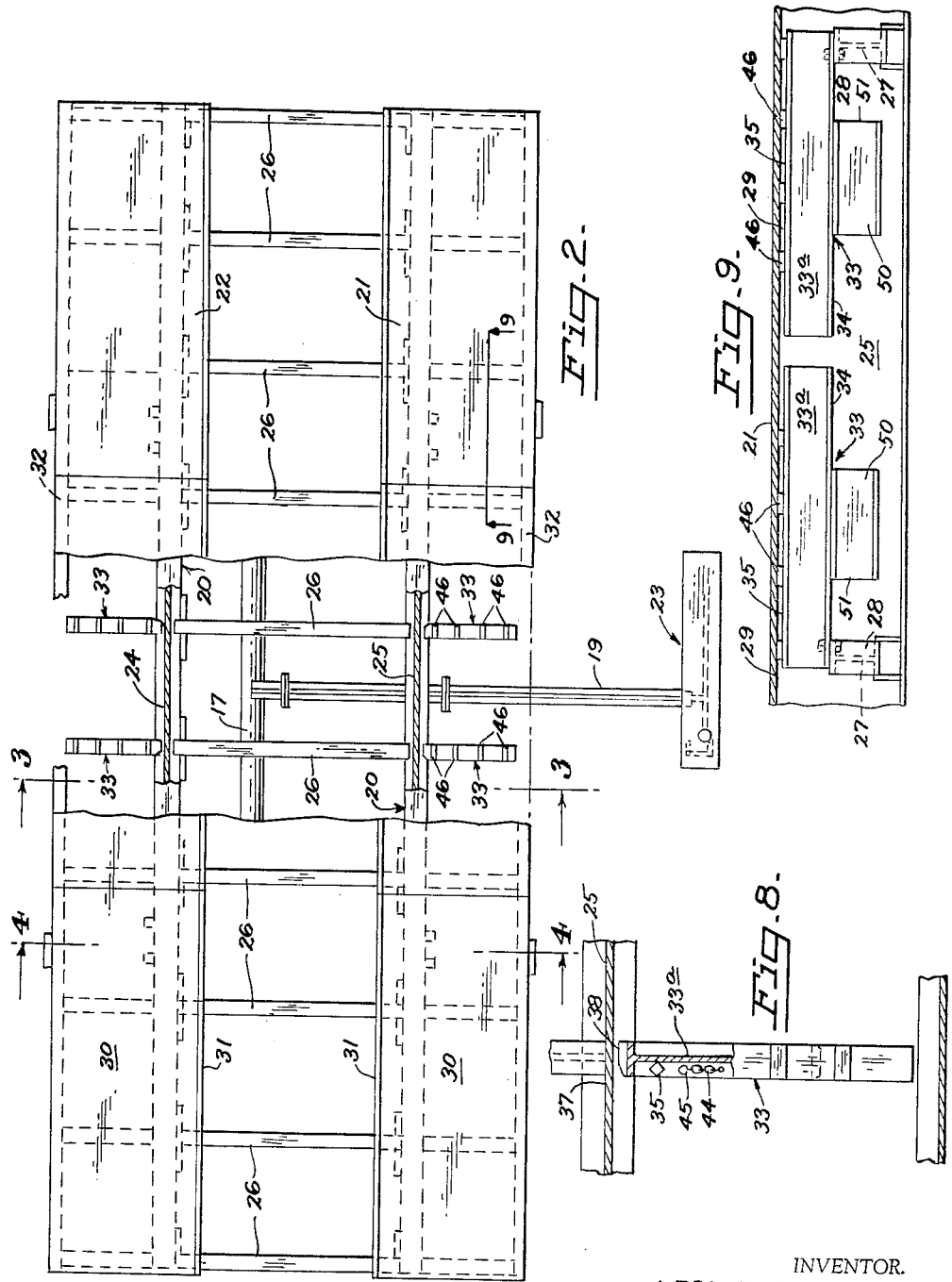

Jan. 26, 1965   L. R. MURPHY   3,167,141
TRANSPORTABLE SCALE WITH EXTENDIBLE WIDTH
Filed July 23, 1963   3 Sheets-Sheet 3
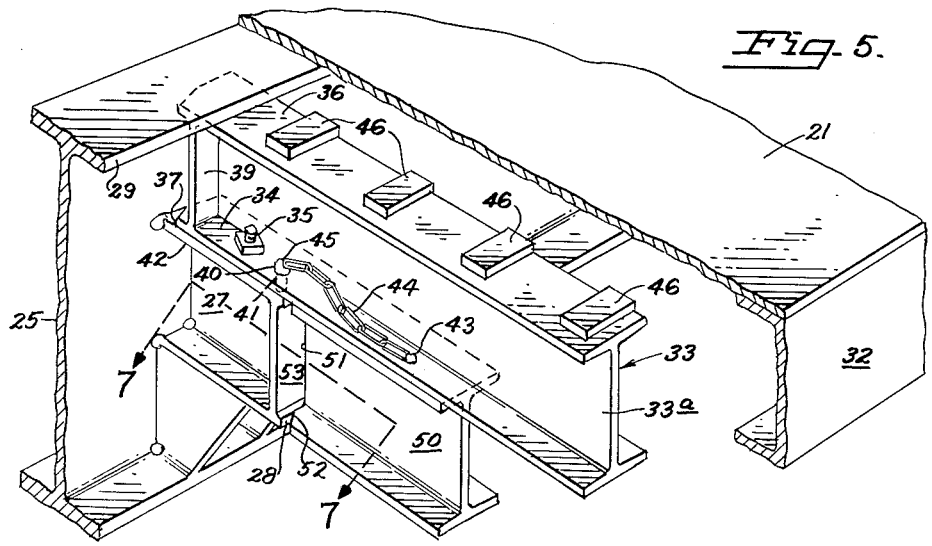
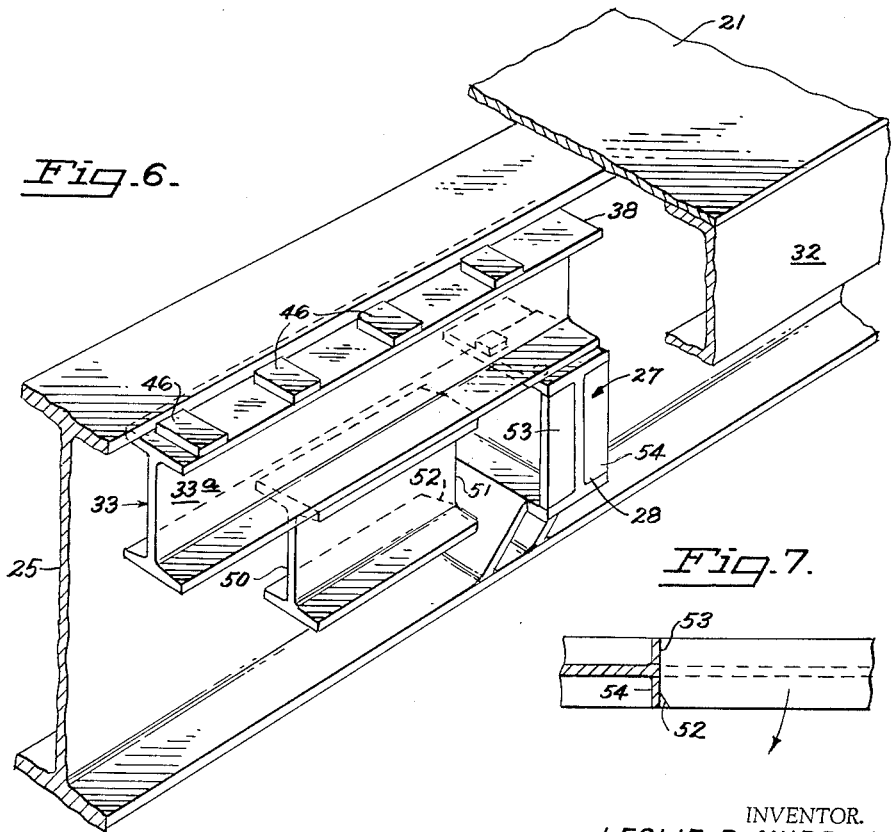
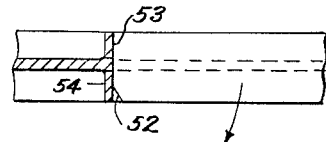
INVENTOR.
LESLIE R. MURPHY
BY
Owen, Wickersham & Erickson
ATTORNEYS

United States Patent Office 3,167,141
Patented Jan. 26, 1965

3,167,141
TRANSPORTABLE SCALE WITH EXTENDIBLE WIDTH
Leslie R. Murphy, Sacramento, Calif., assignor to L. R. Murphy Scale Company, Sacramento, Calif., a corporation of California
Filed July 23, 1963, Ser. No. 297,122
5 Claims. (Cl. 177—126)

This invention relates to improvements in transportable scales for weighing motor trucks, off-the-highway vehicles, and the like; more particularly it relates to the type of transportable scale having a deck whose width can be extended at a weighing station and can be narrowed for highway transport. Specifically, this invention is an improvement over my invention covered by U.S. Patent No. 3,097,713, issued July 16, 1963.

Heavy-duty transportable scales are difficult to provide. If a scale is wide enough so that a wide truck, barely within the highway width-limit, can be driven on the scale and weighed, then that scale is obviously wider than the limit. At present, the legal highway width is eight feet, and it is fairly easy to get a permit to move a load no more than ten feet wide. However, it is difficult to get permission to move loads wider than ten feet. Consequently, many trucks are used that are ten feet wide and that have to be weighed when loaded. Moreover, in order to weigh off-the-highway equipment (such as many earth movers and much road-building equipment) a scale with a deck thirteen or even fourteen feet wide is required. In order to get such scales to their destination or to move them from place to place, it is most inconvenient to have the scale width during transportation exceed ten feet, and in most cases scales as wide as thirteen feet would be out of the question because of the difficulty in transporting them.

Similar relationships apply to the different specific load widths that are permissible in various states. When scales are transported on rail cars and the like, there is also a standard width that must be maintained. Similar factors have to be considered even when the scales are transported off the highways, for even then they are used for weighing large off-the-highway vehicles as well as the oversize trucks which themselves are used to transport the scales. Also, clearances must be watched. In each case it is desirable to have some way to extend the width of the scale when it is used for weighing and to reduce its width when the scale is to be transported.

My earlier Patent No. 3,097,713 provides an interesting and novel solution to this problem, comprising a scale whose width can be extended at the weighing station and can be narrowed for transport. The present invention provides an improvement enabling the same width weighbridge to support a deck in a way that the deck can be extended twice as far as could that of my earlier invention.

A problem which had to be solved for successful operation of such a scale is how to support the overhang of the scale platform or deck beyond the main weighbridge girders. The rigid frame comprising the weighbridge, and made up of the main girders and the cross members, cannot be the full maximum width, nor can the weighbridge itself be extensible, because if it were, it would not have the required rigidity and strength and would not properly transmit the load to the scale lever system. The present invention like my Patent No. 3,097,713 provides a deck or runway that comprises two separate pieces that rest on the weighbridge and can be moved toward each other to condense the width or away from each other to extend the width of the platform. If the scale deck is extensible and overhangs the weighbridge, as is true in the present invention, the problem then arises as to how to keep the overhanging portion from bending under the tremendous weights to which it is subjected. Even though checkered steel plate is a relatively strong material, it bends readily enough under the weight of the many-ton loads that these scales are intended to weigh. Timber decks will break under these conditions. If the platform or deck were made of rigid material that could withstand these weights, the scale would no longer be transportable.

In other words, the invention provides extensible support means for a rather lightweight steel plate deck or for a timber deck, so that the deck does not bend over or break when a truck is driven onto it slightly out of line with part of the truck overhanging the weighbridge. As has been said before, the weighbridge itself cannot be extensible along with the platform. The present invention, therefore, is directed particularly to the solution of the problem of an extensible weighing platform with adequate support for the portion that overhangs the weighbridge.

Again like my earlier invention in Patent No. 3,097,713, the present invention provides a series of short outrigger brackets along the side of the weighbridge frame and provides a series of swinging outriggers. The outriggers are secured to the outrigger brackets by a pivotal connection extending along a vertical axis and are mounted so that they can be swung out to give an effectual widening of the weighbridge frame or can be swung in so that they do not protrude beyond the outrigger brackets of the weighbridge frame. In that way the two runways making up the deck or scale platform can be pushed together until their overall width is no greater than that of the weighbridge frame when the scale is to be transported. Then they can be pulled apart and the outriggers swung out to support the portions of a wide deck where it overhangs the weighbridge frame.

The present invention adds to the device disclosed in Patent No. 3,097,713 a structure providing support for an outrigger that is twice as long as outriggers could be successfully made before the present invention. It utilizes the invention as described and as claimed in Patent No. 3,097,713, and it does not extend the length of the outrigger bracket, yet it provides additional support for the outriggers. By this means, the outrigger may be about four times as long as the supporting outrigger bracket on which it rests; instead of about twice as long, as was the maximum formerly obtainable. Three-fourths of the outrigger extends beyond the bracket, but by an ingenious structure this overhanging portion of the structure is supported through a member which swings with the outrigger and carries the bearing load into the bracket.

Other objects and advantages of the invention will appear from the following description of a preferred embodiment thereof.

In the drawings:

FIG. 1 is a view in perspective of a transportable scale, embodying the principles of the present invention, mounted upon a large transport truck, with a steel-plate scale platform shown in its narrow-width or transporting position.

FIG. 2 is a top plan view of the scale with some portions broken away in order to show some of the lever system and frame members therebeneath.

FIG. 3 is a view in elevation and in vertical cross section of the scale of FIG. 1 mounted on the ground and prepared for weighing, taken along the line 3—3 in FIG. 2. The steel platform members or runways are shown in their extended position overhanging the weighbridge and supported by outriggers that have been swung to their extended position.

FIG. 4 is a view in section of a portion of the scale of FIG. 3 taken along the line 4—4 of FIG. 2 showing the position occupied by the steel platforms and the outrigger brackets when the scale platforms are moved to their inner or transporting position.

FIG. 5 is an enlarged fragmentary view in perspective of a portion of the scale showing one of the outriggers swung to its outer position for supporting the scale platform in its extended position.

FIG. 6 is a similar view showing the same outrigger swung to its inner position for the scale platform to be supported in its transporting position.

FIG. 7 is a fragmentary view taken along the line 7—7 in FIG. 5, but on a reduced scale.

FIG. 8 is a fragmentary top plan view, with some parts broken away and shown in section, of a portion of the scale of FIG. 2 with the platform removed and the outrigger swung to its outer position.

FIG. 9 is a fragmentary view in side elevation and in section of a portion of the scale of FIG. 2, taken generally along the line 9—9 but with the outriggers folded in.

Although it is transportable, as shown in FIG. 1, the scale of this invention is designed for heavy duty weighing and when set up as shown in FIG. 3, its base 15 is preferably supported on a suitable footing 16. By a suitable suspension system of the type well known in the art and only rudimentarily indicated in the drawings (it includes levers 17, 18 and 19) the base 15 supports a weighbridge 20 on which rest a pair of runways or platform members 21 and 22, which may be of steel or timber. The purpose of the deck or platform members 21 and 22 is to provide a surface on which the trucks can be driven when they are to be weighed and to transmit the load evenly to the weighbridge 20. The weighbridge 20, in turn, when depressed by the load, transmits the force through the levers 17, 18 and 19 so as to actuate a suitable lever indicating device 23 shown at the left of FIG. 3 and at the bottom of FIG. 2. There, weighbeams dial units or other indicating devices may be supplied.

This invention is concerned chiefly with the connection and cooperation between the weighbridge 20 and the platform members 21 and 22. As shown in the drawings, the weighbridge 20 preferably incorporates two very strong, heavy I-beams 24 and 25 disposed longitudinally of the scale and parallel to each other and connected together at various points by suitable laterally extending structural members 26. To the outer side of the I-beams 24 and 25 are welded, at intervals, suitable short I-beam extension members or outrigger brackets 27. The distance between the outer end 28 of the outrigger brackets 27 on one side to that on the other side corresponds approximately to the legal width of the road or to some greater width that is about the maximum for which permits are easily obtainable. In other words, where 8 feet is the legal width, the ends 28 of a scale designed for no-permit use lie approximately 8 feet apart and the I-beams 24 and 25 lie just slightly less than 8 feet apart. Or, for permit use, where a ten-foot load is the widest normally permitted, the ends 28 may lie ten feet apart. For convenience, the brackets 27 preferably are aligned with the cross members 26, although this is not absolutely necessary.

Each steel runway 21, 22 comprises a flat deck 30, preferably made of a long strip of checkered steel plate (which may be thin, e.g., ¼" to ⁵⁄₁₆" thick, more or less) usually in lengths of approximately 10 or 12 feet. However, a timber deck may be used. Preferably but not necessarily, the deck is provided along the inner edge with an upstanding stiffening flange 31 adapted to prevent the wheels of the vehicles to be weighed from driving off the runway 21, 22. To the lower surface of the steel deck 30, along its outer edge, is welded a steel structural member 32 such as a channel beam.

On top of each outrigger bracket 27, which is always considerably shorter in height than the I-beams 24 and 25 and is mounted a spaced distance down from their top surface, is pivotally mounted an outrigger 33. Each outrigger 33 preferably comprises an upper I-beam 33ᵃ about four times as long as the bracket 27 with a base 34 joined by a pivot bolt 35 to its outrigger bracket 27. This bolt 35 extends in the present invention through the base 34 on the side that lies on the inside side when the outrigger 33 is folded in. The outrigger 33 also has a top horizontal portion 36 bearing against the flange 29 of the I-beam 25, and preferably, one side of the inner end of both the portion 36 and the base 34 is cut back along an edge or radius portion 37 to enable clearance when the outrigger 33 swings and which determines which way it will turn, the other side 38 being left square to prevent turning in the other direction. Also, the beveled edges or radii 37 may be strengthened, if desired, by welding a vertical member 39 to them, connecting them together.

The base 34 (see FIG. 6) also has a hole 40 spaced from pivot pin 35, and the outrigger bracket 27 has a hole 41 in its top member 42 aligns with the hole 40 when the outrigger 33 is swung out to its extended position. The swinging outrigger 33 has a bracket 43 (see FIG. 5) to which a chain 44 is attached; at the end of the chain 44 is a suitable locking pin or rivet 45. When the outrigger 33 is swung about its pivot member 35 into its inner position, it normally rests fairly snugly against the I-beam 24 or 25, and its width is less than the length of the bracket 27. When the platforms are then pushed in, the channels 32 help to keep the outriggers 33 from swinging out accidentally. When the outrigger 33 is swung out to its outer position, it may be locked to the outrigger bracket 27 by the locking pin 45 to prevent accidental movement; in that position the outrigger 33 extends a substantial lateral distance beyond the bracket 27, this difference being approximately equal to the extension of width needed on each side of the scale.

In addition, the top plates 36 of the outriggers 33 preferably support a series of short plates 46 whose thickness is such that their upper surfaces lie substantially level with the I-beam upper surfaces of the I-beams 24 and 25, so that the steel platforms 21, 22 are properly supported. Being spaced from the inner end 38, the plates 46 (one of which is on the outer end), do not interfere with the movement of the end 38 in under the top of the I-beam 24, 25 when the outrigger is extended.

The present invention adds to the outrigger 33 a lower I-beam 50, welded securely to the base 34 of the upper I-beam 33ᵃ at a position where its end 51 abuts the end 28 of the outrigger bracket 27 when the outrigger 33 is extended. Since the pivot bolt 35 is not centered but is well to one side of the axes of the outrigger bracket 27 and of the outrigger 33, only a small portion 52 of the lower edge of the bracket 27 need be relieved to enable swinging of the lower I-beam 50 in against the rest of the end 28. The bracket 27 is strengthened by end face plates 53, 54 welded to it at the end 28.

The lower I-beam 50 is somewhat more than one-third as long as the outrigger 33. Hence, when the outrigger 33 is extended, about one-fourth of the upper I-beam 33ᵃ rests directly on the bracket 27, more than one-third rests on the lower I-beam 50, and only a little more than one-fourth is unsupported—about the same actual amount as in my former patent. The center third rests on the beam 50 and the I-beam 50 bears on the bracket 27, so that the bearing weight does receive support from the frame of the weighbridge 20. Thus about twice as much extension becomes possible.

The significance of this arrangement will now be apparent. All that need be done to extend the width of the scale is to pull out the runways 21 and 22 and then to swing the outriggers 33 out about their pivots 35, lock them in their outer positions by the pins 45, to support the runways 21, 22 and all that need be done to shorten the width of the scale platform is to fold the outriggers 33 back against the I-beams 24, 25, first releasing the locking pin 45, and then push the runways 21, 22 back towards each other. Great strength is provided by the supporting outrigger and by the fact that, when extended, the outrigger's upper beam 33a rests directly on the outrigger bracket 27, and on the lower beam 50 and through that bears on the bracket 27. Thus the outriggers 33 transmit their load to the brackets 27 and they are kept from moving upwardly at their inner end, or swinging up there and swinging down at their outer end, by the engagement of the top portion 36 with the flange 29. The scale runways 21 and 22 may be bolted to the weighbridge frame in both their extended and their transport positions. Bolting gives greater stability, and the bolts are easily removed.

In addition to the change in the outrigger structure, the invention also contemplates the use of knee braces 56, 57 (see FIGS. 3 and 4) which are welded in place to each cross member 26 and to each side girder 24, 25. The braces 56, 57 prevent the bottoms of the girders 24, 25 from flexing in and out when heavy loads are exerted on the outside edges of the platform 21 through the outriggers 33.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a transportable scale with an extensible deck, having a base frame, a weighbridge supported on said base frame by a lever system, said weighbridge having a rigid frame, including longitudinal side members with outer flanges and with extension members projecting laterally out therefrom, and a pair of platforms releasably supported on said weighbridge, the combination therewith of:
   outrigger members each about four times as long as and pivotally supported by said extension members and having an upper beam resting on said extension member and having a lower surface and an upper surface, portion bearing against said flanges and upper surface portions substantially coplanar with the upper surface of said longitudinal side members and adapted to extend the effective width of said weighbridge frame or to fold into a position in which they extend out no further than said extension members,
   each said outrigger member also having a lower beam secured to the lower surface of said upper beam and positioned to engage the outer end of said extension member when said outrigger is in its extended position.

2. The scale of claim 1 having releasable means for locking said outrigger members to said extension members when said outrigger members are in their extended position.

3. The scale of claim 1 wherein said rigid frame includes horizontal cross members extending across upper portions of said side members and wherein knee braces are welded to lower portions of said side members and to said horizontal cross members so that heavy loads bearing through said outrigger members are prevented from undue flexing of the bottoms of said side members.

4. In a transportable scale with an extensible deck, having a base frame, a weighbridge supported on said base frame by a lever system, said weighbridge having a rigid frame, including longitudinal side members with outer flanges on their upper surface and extension members spaced therebelow and projecting out laterally therefrom, and a pair of platforms releasably supported on said weighbridge, the combination therewith of:
   outrigger members each about four times as long as said extension member and pivotally supported by said extension members projecting laterally out therefrom and having an upper beam resting on said extension member with a lower surface and first upper surface portions below said outer flanges and in engagement therewith and second upper surface portions substantially coplanar with the upper surface of said longitudinal side members and adapted in one position to extend the effective width of said weighbridge frame and in another position to fold in against said side members, and
   each said outrigger member also having a lower beam secured to the lower surface of said upper beam and positioned to engage the outer end of said extension member when said outrigger is in its extended position.

5. In a transportable scale with an extensible deck, having a base frame, a weighbridge supported on said base frame by a lever system, said weighbridge having a rigid frame, including longitudinal side members with outer flanges on their upper surface and extension members spaced therebelow and projecting out laterally therefrom, and a pair of platforms releasably supported on said weighbridge, the combination therewith of:
   outrigger members each about four times as long as said extension member and pivotally supported by said extension members projecting laterally out therefrom and having an upper beam resting on said extension member with a lower surface, and first upper surface portions below said outer flanges and in engagement therewith and second upper surface portions substantially coplanar with the upper surface of said longitudinal side members and adapted in one position to extend the effective width of said weighbridge frame and in another position to fold in against said side members,
   each said outrigger member also having a lower beam secured to the lower surface of said upper beam and positioned to engage the outer end of said extension member when said outrigger is in its extended position,
   said weighbridge's rigid frame also having cross members extending across the upper portions of said side members, and
   knee braces extending angularly from and welded to said cross members to lower portions of said side members and welded to them also, for retaining the bottoms of said side members from being flexed in and out by the application to and release of heavy loads on the outer edges of said platform acting through the outrigger members in their extended position.

References Cited in the file of this patent

UNITED STATES PATENTS

| | | |
|---|---|---|
| 3,043,386 | Marion et al. | July 10, 1962 |
| 3,097,713 | Murphy | July 16, 1963 |